US010095146B2

(12) United States Patent
Yamada

(10) Patent No.: US 10,095,146 B2
(45) Date of Patent: Oct. 9, 2018

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/717,754

(22) Filed: Sep. 27, 2017

(65) Prior Publication Data

US 2018/0088482 A1 Mar. 29, 2018

(30) Foreign Application Priority Data

Sep. 29, 2016 (JP) ................. 2016-190476

(51) Int. Cl.
| | | |
|---|---|---|
| *G03G 15/01* | (2006.01) | |
| *G03G 15/00* | (2006.01) | |
| *H04N 1/29* | (2006.01) | |
| *H04N 1/60* | (2006.01) | |
| *G03G 15/08* | (2006.01) | |

(52) U.S. Cl.
CPC ..... *G03G 15/0105* (2013.01); *G03G 15/0813* (2013.01); *G03G 15/5054* (2013.01); *H04N 1/29* (2013.01); *H04N 1/6019* (2013.01); *H04N 2201/0094* (2013.01)

(58) Field of Classification Search
CPC .......... G03G 15/0105; G03G 15/0813; G03G 15/5054; H04N 1/29; H04N 1/6019; H04N 2201/0094
See application file for complete search history.

(56) References Cited

U.S. PATENT DOCUMENTS

2014/0270827 A1* 9/2014 Muto ................. G03G 15/5058
399/49
2015/0050045 A1* 2/2015 Sato ................... G03G 21/1842
399/111

FOREIGN PATENT DOCUMENTS

| JP | H05-241436 A | 9/1993 |
| JP | 2006-171245 A | 6/2006 |
| JP | 2013-210489 A | 10/2013 |
| JP | 2014-102341 A | 6/2014 |

* cited by examiner

*Primary Examiner* — Hoang Ngo
(74) *Attorney, Agent, or Firm* — Canon U.S.A., Inc. IP Division

(57) ABSTRACT

An image formation apparatus includes an image bearing member on which an electrostatic latent image is formed and a developing agent bearing member configured to carry a developer used to develop the electrostatic latent image formed on the image bearing member. The image formation apparatus forms an image by using the electrostatic latent image formed on the image bearing member. The image formation apparatus further includes an obtaining unit configured to obtain the information about a rotation speed of the image bearing member and a rotation speed of the developing agent bearing member; a determination unit configured to determine, according to the obtained information, a color conversion table used to transfer and record the input image data; and an image formation unit configured to convert a signal of the input image data according to the determined color conversion table and form an image with the converted signal value.

13 Claims, 14 Drawing Sheets

FIG. 5A

|  | NORMAL | HIGH CHROMA |
|---|---|---|
| PLAIN PAPER | 1 / 1 | 1 / 2 |
| THICK PAPER | 1 / 2 | 1 / 2 |
| GLOSSY PAPER | 1 / 3 | 1 / 3 |

FIG. 5B

|  | NORMAL | HIGH CHROMA |
|---|---|---|
| PLAIN PAPER | 1 / 1 | 1 / 1 |
| THICK PAPER | 1 / 2 | 1 / 1 |
| GLOSSY PAPER | 1 / 3 | 1 / 1 |

FIG. 8

| PERIPHERAL SPEED RATIO | COLOR CONVERSION TABLE |
|---|---|
| 1 : 1 | A |
| 1 : 2 | B |
| 1 : 3 | C |

| COLOR CONVERSION TABLE A | | | | | | |
|---|---|---|---|---|---|---|
| INPUT VALUE | | | OUTPUT VALUE | | | |
| R | G | B | C | M | Y | K |
| 0 | 0 | 0 | 98 | 78 | 118 | 255 |
| 0 | 0 | 17 | 114 | 96 | 110 | 222 |
| 0 | 0 | 34 | 128 | 113 | 102 | 192 |
| 0 | 0 | 51 | 143 | 129 | 94 | 163 |
| 0 | 0 | 68 | 156 | 144 | 87 | 137 |
| 0 | 0 | 85 | 168 | 158 | 79 | 113 |
| 0 | 0 | 102 | 180 | 171 | 71 | 92 |
| 0 | 0 | 119 | 191 | 184 | 63 | 73 |
| 0 | 0 | 136 | 200 | 195 | 55 | 56 |
| 0 | 0 | 153 | 209 | 205 | 47 | 41 |
| 0 | 0 | 170 | 217 | 214 | 39 | 28 |
| 0 | 0 | 187 | 224 | 222 | 31 | 18 |
| 0 | 0 | 204 | 230 | 229 | 24 | 10 |
| 0 | 0 | 221 | 234 | 234 | 16 | 5 |
| 0 | 0 | 238 | 238 | 237 | 8 | 1 |
| 0 | 0 | 255 | 255 | 255 | 0 | 0 |
| 0 | 0 | 0 | 98 | 78 | 118 | 255 |
| 0 | 0 | 17 | 114 | 96 | 110 | 222 |
| 0 | 0 | 34 | 128 | 113 | 102 | 192 |
| ⋮ | ⋮ | ⋮ | ⋮ | ⋮ | ⋮ | ⋮ |
| 255 | 0 | 0 | 0 | 255 | 255 | 0 |
| ⋮ | ⋮ | ⋮ | ⋮ | ⋮ | ⋮ | ⋮ |
| 255 | 136 | 0 | 0 | 111 | 247 | 0 |
| 255 | 136 | 17 | 0 | 111 | 230 | 0 |
| 255 | 136 | 34 | 0 | 110 | 212 | 0 |
| 255 | 136 | 51 | 0 | 110 | 195 | 0 |
| 255 | 136 | 68 | 0 | 110 | 178 | 0 |
| 255 | 136 | 85 | 0 | 110 | 161 | 0 |
| 255 | 136 | 102 | 0 | 110 | 144 | 0 |
| 255 | 136 | 119 | 0 | 110 | 127 | 0 |
| 255 | 136 | 136 | 0 | 111 | 111 | 0 |
| 255 | 136 | 153 | 0 | 112 | 95 | 0 |
| 255 | 136 | 170 | 0 | 113 | 79 | 0 |
| ⋮ | ⋮ | ⋮ | ⋮ | ⋮ | ⋮ | ⋮ |
| 255 | 255 | 170 | 0 | 0 | 85 | 0 |
| 255 | 255 | 187 | 0 | 0 | 68 | 0 |
| 255 | 255 | 204 | 0 | 0 | 51 | 0 |
| 255 | 255 | 221 | 0 | 0 | 34 | 0 |
| 255 | 255 | 238 | 0 | 0 | 17 | 0 |
| 255 | 255 | 255 | 0 | 0 | 0 | 0 |

| COLOR CONVERSION TABLE B ||||||| 
| INPUT VALUE ||| OUTPUT VALUE ||||
| R | G | B | C | M | Y | K |
|---|---|---|---|---|---|---|
| 0 | 0 | 0 | 93 | 74 | 111 | 255 |
| 0 | 0 | 17 | 108 | 91 | 104 | 210 |
| 0 | 0 | 34 | 121 | 107 | 96 | 182 |
| 0 | 0 | 51 | 136 | 122 | 89 | 154 |
| 0 | 0 | 68 | 148 | 137 | 82 | 129 |
| 0 | 0 | 85 | 159 | 150 | 74 | 107 |
| 0 | 0 | 102 | 171 | 162 | 67 | 87 |
| 0 | 0 | 119 | 181 | 175 | 59 | 69 |
| 0 | 0 | 136 | 190 | 185 | 52 | 53 |
| 0 | 0 | 153 | 198 | 195 | 44 | 38 |
| 0 | 0 | 170 | 206 | 203 | 36 | 26 |
| 0 | 0 | 187 | 213 | 211 | 29 | 17 |
| 0 | 0 | 204 | 218 | 217 | 22 | 9 |
| 0 | 0 | 221 | 224 | 224 | 15 | 4 |
| 0 | 0 | 238 | 230 | 228 | 7 | 0 |
| 0 | 0 | 255 | 255 | 255 | 0 | 0 |
| 0 | 0 | 0 | 93 | 74 | 111 | 255 |
| 0 | 0 | 17 | 108 | 91 | 104 | 210 |
| 0 | 0 | 34 | 121 | 107 | 96 | 182 |
| ⋮ | ⋮ | ⋮ | ⋮ | ⋮ | ⋮ | ⋮ |
| 255 | 0 | 0 | 0 | 255 | 255 | 0 |
| ⋮ | ⋮ | ⋮ | ⋮ | ⋮ | ⋮ | ⋮ |
| 255 | 136 | 0 | 0 | 105 | 243 | 0 |
| 255 | 136 | 17 | 0 | 105 | 218 | 0 |
| 255 | 136 | 34 | 0 | 104 | 200 | 0 |
| 255 | 136 | 51 | 0 | 104 | 184 | 0 |
| 255 | 136 | 68 | 0 | 104 | 168 | 0 |
| 255 | 136 | 85 | 0 | 104 | 152 | 0 |
| 255 | 136 | 102 | 0 | 104 | 136 | 0 |
| 255 | 136 | 119 | 0 | 104 | 120 | 0 |
| 255 | 136 | 136 | 0 | 105 | 105 | 0 |
| 255 | 136 | 153 | 0 | 106 | 90 | 0 |
| 255 | 136 | 170 | 0 | 107 | 74 | 0 |
| ⋮ | ⋮ | ⋮ | ⋮ | ⋮ | ⋮ | ⋮ |
| 255 | 255 | 170 | 0 | 0 | 80 | 0 |
| 255 | 255 | 187 | 0 | 0 | 64 | 0 |
| 255 | 255 | 204 | 0 | 0 | 48 | 0 |
| 255 | 255 | 221 | 0 | 0 | 32 | 0 |
| 255 | 255 | 238 | 0 | 0 | 16 | 0 |
| 255 | 255 | 255 | 0 | 0 | 0 | 0 |

| COLOR CONVERSION TABLE C |||||||
|---|---|---|---|---|---|---|
| INPUT VALUE ||| OUTPUT VALUE ||||
| R | G | B | C | M | Y | K |
| 0 | 0 | 0 | 89 | 70 | 106 | 255 |
| 0 | 0 | 17 | 103 | 87 | 99 | 200 |
| 0 | 0 | 34 | 116 | 102 | 92 | 173 |
| 0 | 0 | 51 | 129 | 117 | 84 | 147 |
| 0 | 0 | 68 | 141 | 130 | 78 | 123 |
| 0 | 0 | 85 | 152 | 143 | 71 | 101 |
| 0 | 0 | 102 | 163 | 155 | 64 | 83 |
| 0 | 0 | 119 | 173 | 167 | 56 | 65 |
| 0 | 0 | 136 | 181 | 177 | 49 | 50 |
| 0 | 0 | 153 | 189 | 186 | 42 | 36 |
| 0 | 0 | 170 | 197 | 194 | 35 | 25 |
| 0 | 0 | 187 | 203 | 201 | 27 | 16 |
| 0 | 0 | 204 | 209 | 208 | 21 | 9 |
| 0 | 0 | 221 | 216 | 216 | 14 | 4 |
| 0 | 0 | 238 | 224 | 222 | 7 | 0 |
| 0 | 0 | 255 | 255 | 255 | 0 | 0 |
| 0 | 0 | 0 | 89 | 70 | 106 | 255 |
| 0 | 0 | 17 | 103 | 87 | 99 | 200 |
| 0 | 0 | 34 | 116 | 102 | 92 | 173 |
| : | : | : | : | : | : | : |
| 255 | 0 | 0 | 0 | 255 | 255 | 0 |
| 255 | 136 | 0 | 0 | 100 | 240 | 0 |
| 255 | 136 | 17 | 0 | 100 | 207 | 0 |
| 255 | 136 | 34 | 0 | 99 | 191 | 0 |
| 255 | 136 | 51 | 0 | 99 | 175 | 0 |
| 255 | 136 | 68 | 0 | 99 | 160 | 0 |
| 255 | 136 | 85 | 0 | 99 | 145 | 0 |
| 255 | 136 | 102 | 0 | 99 | 129 | 0 |
| 255 | 136 | 119 | 0 | 99 | 114 | 0 |
| 255 | 136 | 136 | 0 | 100 | 100 | 0 |
| 255 | 136 | 153 | 0 | 101 | 85 | 0 |
| 255 | 136 | 170 | 0 | 102 | 71 | 0 |
| : | : | : | : | : | : | : |
| 255 | 255 | 170 | 0 | 0 | 76 | 0 |
| 255 | 255 | 187 | 0 | 0 | 61 | 0 |
| 255 | 255 | 204 | 0 | 0 | 46 | 0 |
| 255 | 255 | 221 | 0 | 0 | 30 | 0 |
| 255 | 255 | 238 | 0 | 0 | 15 | 0 |
| 255 | 255 | 255 | 0 | 0 | 0 | 0 |

| PAPER TYPE | OUTPUT TYPE | ROTATION SPEED OF PHOTOCONDUCTIVE DRUM | ROTATION SPEED OF DEVELOPING ROLLER |
|---|---|---|---|
| PLAIN PAPER | NORMAL | SA | SD |
| | HIGH CHROMA | SB | SD |
| THICK PAPER | NORMAL | SB | SE |
| | HIGH CHROMA | SB | SD |
| GLOSSY PAPER | NORMAL | SC | SF |
| | HIGH CHROMA | SC | SD |

|  | ROTATION SPEED OF DEVELOPING ROLLER | | | 1200 |
|---|---|---|---|---|
|  | SD | SE | SF |  |
| ROTATION SPEED OF PHOTOCONDUCTIVE DRUM — SA | A | - | - |  |
| SB | B | A | - |  |
| SC | C | - | A |  |

IMAGE PROCESSING APPARATUS, IMAGE PROCESSING METHOD, AND MEDIUM

BACKGROUND

Field of the Disclosure

The present disclosure generally relates to image processing and, more particularly, to an image processing apparatus, an image processing method, and a medium that are capable of switching color conversion tables according to the peripheral speed ratio between the photoconductive drum and the developing roller.

Description of the Related Art

An electrophotographic image formation apparatus records an image by forming an electrostatic latent image on a photoconductive drum, making the toner adhere to a photoconductive drum with a developer to develop the electrostatic latent image, and transferring the toner from the photoconductive drum onto a recording sheet. Japanese Patent Laid-Open No. 2013-210489 discloses a technique to extend a color gamut that is reproducible when an image is output by varying the peripheral speed ratio between the photoconductive drum and the developing roller of such an image formation apparatus.

However, such a variable peripheral speed ratio of the developing roller to the photoconductive drum changes the amount of toner supply to be used to form an image. When the color gamut extends, the density of the whole output image including a low-density part is changed. As a result, a color in a color gamut which is reproducible when the photoconductive drum rotates at the same peripheral speed as the developing roller may be changed because of the change of the amount of toner supply with the change of the peripheral speed ratio.

SUMMARY

According to one or more aspects of the present disclosure, an image formation apparatus includes an image bearing member on which an electrostatic latent image is formed and a developing agent bearing member configured to carry a developing agent used to develop the electrostatic latent image formed on the image bearing member. The image formation apparatus forms an image by using the electrostatic latent image formed on the image bearing member. The image formation apparatus further includes an obtaining unit configured to obtain the information about a rotation speed of the image bearing member and a rotation speed of the developing agent bearing member, and a determination unit configured to determine a color conversion table to be used to transfer and record the input image data according to the information about the rotation speed of the image bearing member and the rotation speed of the developing agent bearing member that is obtained with the obtaining unit.

Further features of the present disclosure will become apparent from the following description of exemplary embodiments (with reference to the attached drawings).

BRIEF DESCRIPTION OF THE DRAWINGS

FIG. 5A is a table of the rotation speeds of a photoconductive drum, and FIG. 5B is a table of the rotation speeds of a developing roller according to one or more aspects of the present disclosure.

FIG. 8 is a table of color conversion tables corresponding to the peripheral speed ratios between the photoconductive drum and the developing roller according to one or more aspects of the present disclosure.

FIGS. 9A to 9C are diagrams of the color conversion tables according to one or more aspects of the present disclosure.

FIG. 11 is a table of the rotation speeds of the developing roller and the photoconductive drum that are determined according to the paper type and the output type according to one or more aspects of the present disclosure.

FIG. 12 is a color conversion table selection table used to select a color conversion table according to the rotation speeds of the developing roller and the photoconductive drum according to one or more aspects of the present disclosure.

DESCRIPTION OF THE EMBODIMENTS

Various exemplary embodiments, features, and aspects of the disclosure will be described in detail below with reference to the drawings.

One or more aspects of the present disclosure will be described hereinafter with reference to the appended drawings. Note that the disclosure according to the scope of claims is not limited to the embodiments described below, and all of the combinations of the properties described in the embodiments are not necessarily required for aspects of the present disclosure.

First Embodiment

A first embodiment of the present disclosure will be described first with reference to FIG. 1. The present disclosure can be applied to both of monochrome and multi-color electrophotographic image formation apparatuses such as a copy machine, a Multi Function Peripheral (hereinafter referred to as MFP), a laser printer, and a facsimile. Note that an MFP having, for example, a scan function, a print function, a copy function, and a transmission function will be described as an exemplary image formation apparatus using the present disclosure in the first embodiment described below. In addition, an MFP capable of forming a multi-color image on a recording material with developing agents (toner) of a plurality of colors (four colors CMYK) will be described as an example.

<Hardware Configuration of Image Formation Apparatus>

Figure 1:
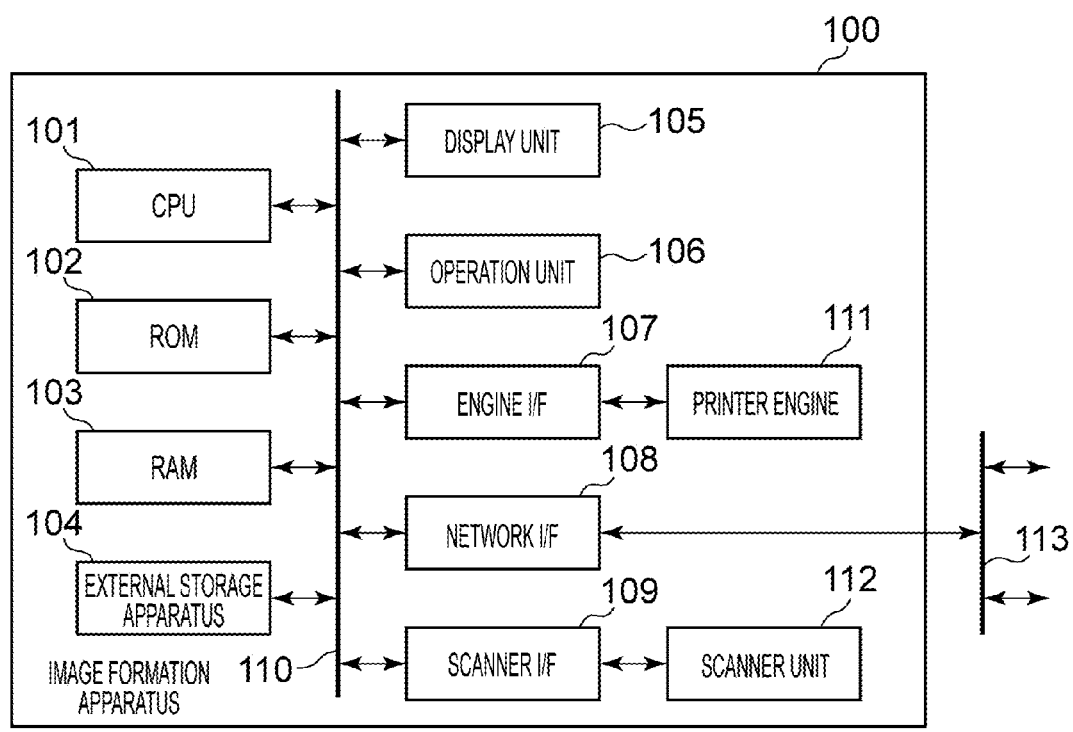
FIG. 1 is a block diagram of a configuration of a system of an image formation apparatus according to one or more aspects of the present disclosure.

FIG. 1 is a block diagram of a hardware configuration of an image formation apparatus 100 according to the first embodiment. The image formation apparatus 100 includes a central processing unit (CPU) 101, a read-only memory (ROM) 102, a random access memory (RAM) 103, an external storage apparatus 104, a display unit 105, an operation unit 106, an engine interface (I/F) 107, a network I/F 108, and a scanner I/F 109. These devices are mutually connected via a system bus 110. The image formation apparatus 100 further includes a printer engine 111 and a scanner unit 112. The printer engine 111 and the scanner unit 112 are connected to the system bus 110 via the engine I/F 107 and the scanner I/F 109, respectively.

The CPU 101, which may include one or more processors and one or more memories, controls the operation of the whole image formation apparatus 100. The CPU 101 performs various processes described below by reading a program stored on the ROM 102 onto the RAM 103 and executing the program. The ROM 102 is a read-only memory so that, for example, a system boot program, a program for controlling the printer engine, character data, and character code information are stored on the ROM 102. The RAM 103 is a volatile random access memory and used as a work area of the CPU 101, and a temporal storage area for various data. For example, the RAM 103 is used as a storage area, for example, for storing font data downloaded and additionally registered, or an image file received from an external device. The external storage apparatus 104 includes, for example, a hard disk to store various data in spooling, and is used as a storage area or a work area for a program, an information file, image data, etc.

The units described throughout the present disclosure are exemplary and/or preferable modules for implementing processes described in the present disclosure. The modules can be hardware units (such as circuitry, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The display unit 105 includes, for example, a Liquid Crystal Display (hereinafter referred to as LCD) and is used, for example, to display the setting condition of the image formation apparatus 100, a status of a currently performed process, or an error status. The operation unit 106 includes input devices such as a hard key and a touch panel provided on the display unit 105, and receives the input (instructions) from the user by the user operation. The operation unit 106 is used to change or reset the settings on the image formation apparatus 100, and is also used to set an operation mode (printing mode) in which the image formation apparatus 100 performs image forming (printing).

The engine I/F 107 functions as an interface to control the printer engine 111 in response to the instructions from the CPU 101 when printing is performed. For example, an engine control command is transmitted and received between the CPU 101 and the printer engine 111 via the engine I/F 107. The network I/F 108 functions as an interface to connect the image formation apparatus 100 to the network 113. Note that the network 113 may be a Local Area Network (hereinafter referred to as LAN), or a public switched telephone network (PSTN). The CPU 101 controls the printer engine 111 to form (print) an image on a recording material such as paper according to the image data received via the system bus 110. The printer engine 111 includes a fixing device (fixing unit) that fixes the toner image transferred on the recording material onto the recording material with heat. The fixing device includes a heating unit (heater) for heating the recording material. The CPU 101 controls the temperature (fixing temperature) of the heater at which an image is fixed on a recording material.

The scanner I/F 109 functions as an interface to control the scanner unit 112 in response to the instructions from the CPU 101 in order to read a document with the scanner unit 112. For example, a scanner unit control command is transmitted and received between the CPU 101 and the scanner unit 112 via the scanner I/F 109. The CPU 101 controls the scanner unit 112 to read an image of a document and generate the image data, and transmit the image data via the scanner I/F 109 to the RAM 103 or the external storage apparatus 104.

<Functional Arrangement of Image Formation Apparatus>

Figure 2:
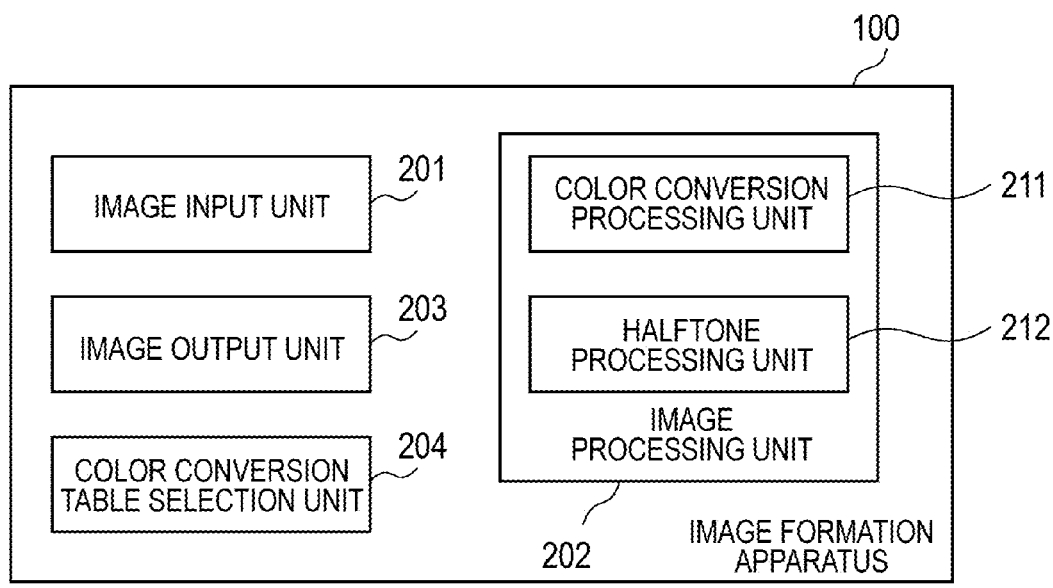
FIG. 2 is a diagram of a functional arrangement of the image formation apparatus according to one or more aspects of the present disclosure.

FIG. 2 is a block diagram of a functional arrangement of the image formation apparatus 100 according to the first embodiment. The image formation apparatus 100 includes an image input unit 201, an image processing unit 202, an image output unit 203, and a color conversion table selection unit 204. To cause each of these functional units to operate on the image formation apparatus 100, the CPU 101 reads a program stored on the ROM 102 onto the RAM 103 and executes the program.

The image input unit 201 receives the image data input to the image formation apparatus 100. The image data may be input from an external device such as a PC via the network 113 and the network I/F 108. Alternatively, the image data may be generated with the scanner unit 112 and input via the scanner I/F 109. The image data to be input is, for example, a bitmap image. The image input unit 201 stores the input of the image data on the RAM 103 or the external storage apparatus 104.

The color conversion table selection unit 204 receives the settings set by the user from the display unit 105, and obtains the rotation speeds of a developing roller 303 and a photoconductive drum 304. The rotation speeds are determined according to the settings. The developing roller 303 and the photoconductive drum 304 are included in the printer engine 111 and the photoconductive drum 304 is an image bearing member. Then, the color conversion table selection unit 204 obtains the peripheral speed ratio determined from the rotation speeds (or the color conversion table selection unit 204 may directly obtain the peripheral speed ratio). Note that the peripheral speed ratio is a ratio of the peripheral speed of the developing roller to the peripheral speed of the photoconductive drum, and is found as the peripheral speed ratio=the peripheral speed of the developing roller÷the peripheral speed of the photoconductive drum×100(%). The ratio may be obtained not only with this method but also with another method. According to the found peripheral speed ratio, a three-dimensional LUT (look up table) is selected from a plurality of three-dimensional LUTs for color conversion from three color RGB (red, green, blue) input into four color CMYK (cyan, magenta, yellow, black) output that is stored on a storage device such as the external storage apparatus or the ROM 102.

The image processing unit 202 processes the input image data in an image process such as a color conversion process or a halftone process. In such a process, the image processing unit 202 converts the input image data into the image data (print data) corresponding to an image that can be output with the image output unit 203 (can be printed on a recording material). In other words, the image processing unit 202 generates the print data from the input image data.

The image output unit 203 receives the print data generated in the image processing unit 202, and transmits the print data as a video signal via the engine I/F 107 to the printer engine 111. After that, the CPU 101 controls the printer engine 111 to form an image on a recording material according to the print data generated with the image processing unit 202. The printer engine 111 prints the image on the recording material by performing exposure, developing, transfer, and fixing processes.

<Image Process in Image Processing Unit>

As illustrated in FIG. 2, the image processing unit 202 includes a color conversion processing unit 211, and a halftone processing unit 212.

The color conversion processing unit 211 uses the three-dimensional LUT selected with the color conversion table selection unit 204 to convert the input image data into the data appropriate for the printer engine 111. For example, when the input image data is the RGB data and the image formation apparatus 100 is a multi-color printer using ordinary CMYK toner, the color conversion processing unit 211 processes the input image data in a process for converting the RGB data into the CMYK data.

The halftone processing unit 212 applies a halftone process to the data converted into the CMYK data with the color conversion processing unit 211. The printer engine 111 is often compatible only with the output of low gradation numbers such as two, four, 16 gradations in general. Thus, the halftone processing unit 212 performs the halftone process in such a way to enable the output with a stable halftone expression even with few gradation numbers. Note that the halftone process performed with the halftone processing unit 212 can use various methods such as a density pattern method, a systematic dither method, or an error diffusion method.

<Configuration of Printer Engine of Image Formation Apparatus>

Figure 3:
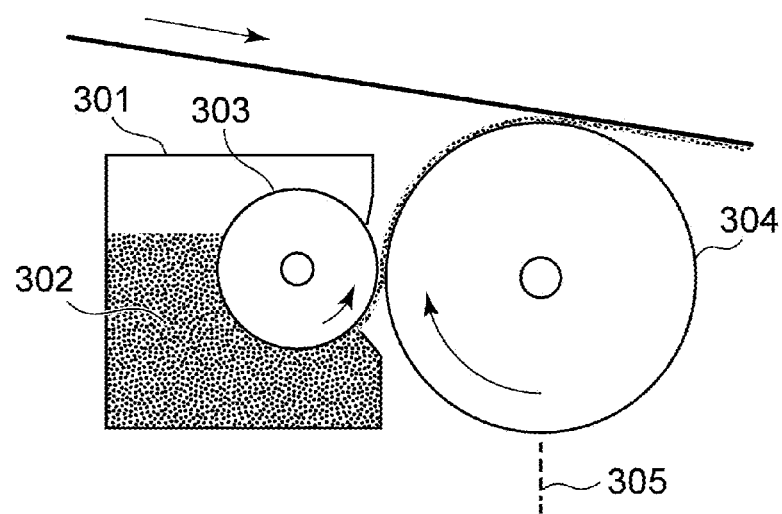
FIG. 3 is a diagram of a part of a configuration of a printer engine according to one or more aspects of the present disclosure.

As illustrated in FIG. 3, the printer engine 111 includes a developer 301 and the photoconductive drum 304 that is an image bearing member. The photoconductive drum 304 is irradiated with a laser 305 such that an electrostatic latent image is formed on the photoconductive drum 304. The developer 301 makes toner 302 adhere as a thin film to the developing roller 303 that is a developing agent bearing member in order to develop the electrostatic latent image formed on the photoconductive drum 304. The image is transferred from the photoconductive drum 304 onto the recording sheet and recorded. The CPU 101 receives the settings set by the user from the display unit 105 and controls the rotation speed of the developing roller 303 and/or the rotation speed of the photoconductive drum 304 (or the peripheral speed(s) proportional to the rotation speed(s)) according to the settings. A multi-color printer using ordinary CMYK toner has a combination of the developer 301 and the photoconductive drum 304 for each color of the toner, and thus has four combinations in total.

Figure 4A:
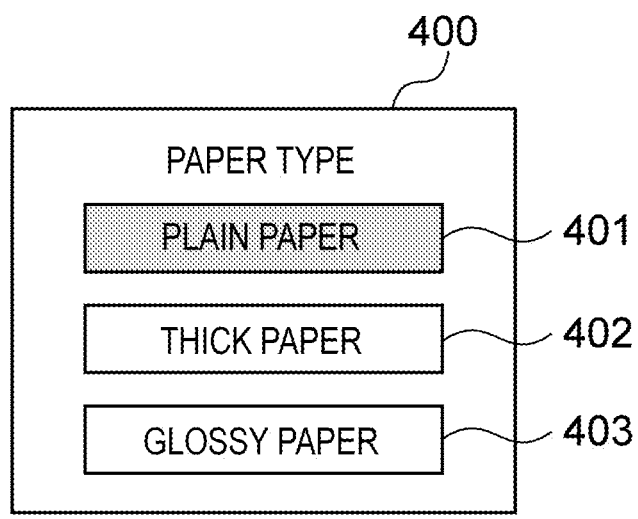
FIG. 4A is a diagram of a paper type setting value selection screen.

FIG. 4A illustrates a paper type selection screen that is an exemplary screen displayed on the display unit 105. Via the paper type selection screen 400, the user selects a type of paper to be used to form the image, and the selected paper type is input as a setting value. When the user sets a value of "plain paper", it is determined that plain paper is set as the recording sheet and the printer engine 111 is controlled. When the user sets a value of "thick paper", it is determined that thick paper is set as the recording sheet and the printer engine 111 is controlled. When the user sets a value of "glossy paper", it is determined that glossy paper is set as the recording sheet and the printer engine 111 is controlled. A reason why the printer engine 111 is controlled according to the selected paper type as described above will be described.

In order to fix the toner on a sheet with heat, adjustment can be made to the fixation speed at which the sheet passes through the fixing unit depending on the paper type of the sheet. In general, thick paper is more difficult to conduct heat than plain paper, and thus the fixation speed is reduced to lengthen the period of time in which the sheet is exposed to the heat source.

According to the fixation speed, the rotation speed of the photoconductive drum 304 is determined. Thus, when the "thick paper" is selected, the fixation speed is reduced. With this reduction, the rotation speed of the photoconductive drum 304 is reduced.

As described above, setting the paper type controls the printer engine 111.

Note that, although the paper type selection screen 400 includes plain paper 401, thick paper 402, and glossy paper 403 as an example, the present disclosure is not limited to these examples of recording mediums.

Figure 4B:
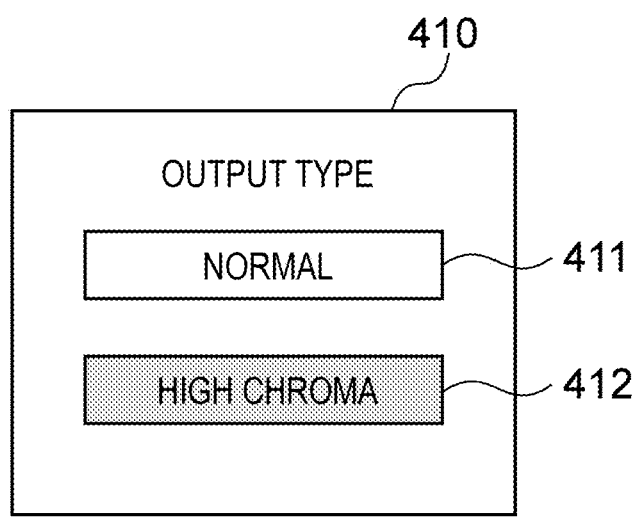
FIG. 4B is a diagram of an output type setting value selection screen according to one or more aspects of the present disclosure.

FIG. 4B illustrates an output type selection screen that is an exemplary screen displayed on the display unit 105. Via the output type selection screen 410, the user selects a type of output, and the selected output type is input as a setting value.

When "high chroma" is selected as the output type instead of "normal", transferring a large amount of toner from the developing roller 303 to the photoconductive drum 304 improves the chroma. In order to transfer a large amount of toner from the developing roller 303 to the photoconductive drum 304, the rotation speed of the developing roller relative to the rotation speed of the photoconductive drum is increased. Thus, the peripheral speed ratio of the developing roller 303 to the photoconductive drum 304 is increased when the "high chroma" is selected.

Note that, although the output type selection screen 410 includes normal 411 and high chroma 412 as an example, another expression may be used.

FIG. 5A illustrates the relationship between the paper type and output type which are set in FIGS. 4A and 4B, and the rotation speed of the photoconductive drum 304.

Note that the relationship is illustrated in FIG. 5A on the assumption that the rotation speed of the photoconductive drum 304 is "1 (1/1)" when "plain paper" is selected on the paper type selection screen 400 and "normal" is selected on the output type selection screen 410 in FIGS. 4A and 4B. The photoconductive drum rotation speed table 501 is previously stored on the ROM 102.

When "thick paper" or "glossy paper" is used, the rotation speed of the photoconductive drum 304 is reduced in comparison with when "plain paper" is used. This is because, as described above, the heat conduction varies depending on the type of paper, and thus adjustment can be made to the fixation speed in which the paper sheet passes through the fixing unit that melts the toner by heat and presses and fixes the toner on the paper sheet, and the rotation speed of the photoconductive drum 304 is determined with the fixation speed.

When the "high chroma" is selected as the output type, the rotation speed of the photoconductive drum 304 is similarly reduced in comparison with when the "normal" is selected. As described above, this is because raising the rotation speed ratio (the peripheral speed ratio) of the developing roller 303 to the photoconductive drum 304 transfers more toner to the photoconductive drum 304 than normal.

In general, however, the rotation speeds of the developing roller 303 and the photoconductive drum 304 are set at maximum so that the printing speed is maximized. In light of the foregoing, when the "high chroma" is selected as the output type, the peripheral speed ratio is adjusted by maintaining the rotation speed of the developing roller 303 and reducing the rotation speed of the photoconductive drum 304.

FIG. 5B illustrates the relationship between the paper type and output type which are set in FIGS. 4A and 4B, and the rotation speed of the developing roller 303.

Note that the relationship is illustrated in FIG. 5B on the assumption that the rotation speed of the developing roller 303 is "1 (1/1)" when "plain paper" is selected on the paper type selection screen 400 and "normal" is selected on the output type selection screen 410 in FIGS. 4A and 4B. The developing roller rotation speed table 502 is previously stored on the ROM 102.

When thick paper or glossy paper is used, the rotation speed of the developing roller 303 is reduced in comparison with when plain paper is used. Similarly to the description with FIG. 5A, this is because the heat conduction varies depending on the type of paper, and thus adjustment can be made to the fixation speed in which the paper sheet passes through the fixing unit that melts the toner by heat and presses and fixes the toner on the paper sheet. Accordingly, this is because the rotation speed of the photoconductive drum 304 is determined with the fixation speed.

When the "high chroma" is selected as the output type, the rotation speed of the developing roller 303 is reduced in comparison with when the "normal" is selected. Similarly to the description with FIG. 5A, raising the rotation speed ratio (the peripheral speed ratio) of the developing roller 303 to the photoconductive drum 304 transfers more toner to the photoconductive drum 304 than normal. In general, however, the rotation speeds of the developing roller 303 and the photoconductive drum 304 are set at maximum so that the printing speed is maximized. In light of the foregoing, the peripheral speed ratio is adjusted by maintaining the rotation speed of the developing roller 303 and reducing the rotation speed of the photoconductive drum 304.

Figure 6A:
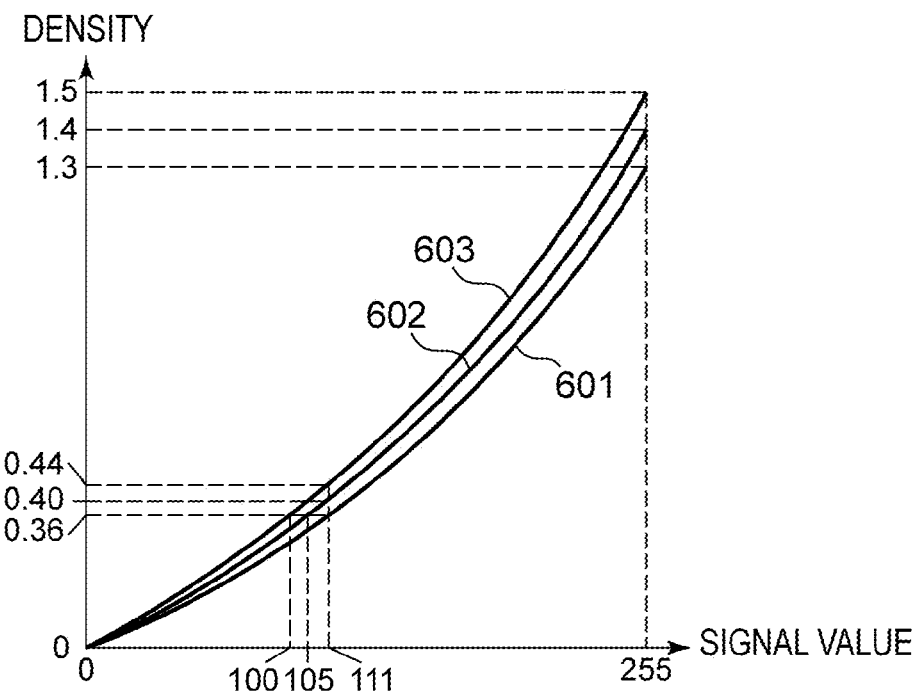
FIG. 6A is a graph of the output density characteristic of the printer engine with respect to the signal values of cyan and magenta.

FIG. 6A illustrates the characteristic of the output density with respect to a data signal value when the data signal value of cyan and magenta is shown on a horizontal axis, and the output density of cyan and magenta is shown on a vertical axis.

A curve 601 is shown when the peripheral speed ratio, which is a ratio between the rotation speed of the photoconductive drum 304 and the rotation speed of the developing roller 303, is 1:1. A curve 602 is shown when the peripheral speed ratio between the rotation speed of the photoconductive drum and the rotation speed of the developing roller is 1:2. A curve 603 is shown when the peripheral speed ratio between the rotation speed of the photoconductive drum and the rotation speed of the developing roller is 1:3.

Note that the peripheral speed ratio between the rotation speed of the photoconductive drum 304 and the rotation speed of the developing roller 303 can be found with FIGS. 5A and 5B.

For example, when the rotation speed of the photoconductive drum 304 is 1/1 and the rotation speed of the developing roller 303 is 1/1, the peripheral speed ratio between the photoconductive drum 304 and the developing roller 303 is 1:1.

When the rotation speed of the photoconductive drum 304 is 1/3 and the rotation speed of the developing roller 303 is 1/1, the peripheral speed ratio between the rotation speed of the photoconductive drum 304 and the rotation speed of the developing roller 303 is 1:3.

When the input signal is 111 and the peripheral speed ratio is 1:1 while the characteristic is shown as described above, the output density is 0.36. When the peripheral speed ratio is 1:2, the output density is 0.40. When the peripheral speed ratio is at an output density of 0.44 and the output is in monochrome such as cyan or magenta, the chroma also varies.

To illustrate the density characteristics of cyan and magenta simultaneously in FIG. 6A, cyan and magenta have an identical density characteristic. However, cyan and magenta each may have a unique density characteristic, and thus cyan and magenta do not necessarily have an identical density characteristic.

Figure 6B:
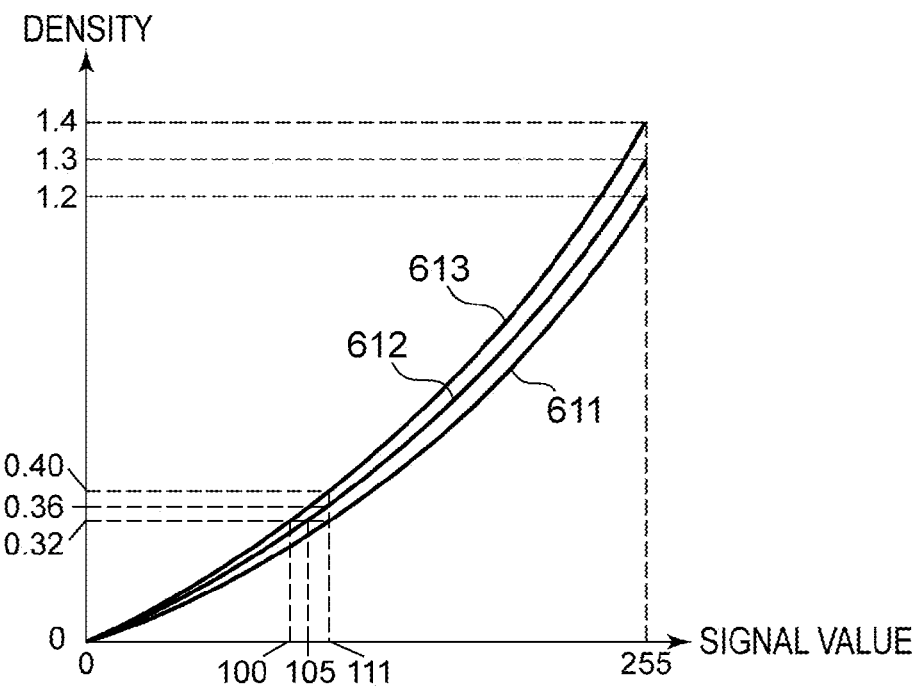
FIG. 6B is a graph of the output density characteristic of the printer engine with respect to the signal values of yellow and black.

FIG. 6B illustrates the characteristic of the output density with respect to a data signal value when the data signal value of yellow and black is shown on a horizontal axis, and the output density of yellow and black is shown on a vertical axis. A curve 611 is shown when the peripheral speed ratio between the rotation speed of the photoconductive drum 304 and the rotation speed of the developing roller 303 is 1:1. A curve 612 is shown when the peripheral speed ratio between the rotation speed of the photoconductive drum 304 and the rotation speed of the developing roller 303 is 1:2. A curve 613 is shown when the peripheral speed ratio between the rotation speed of the photoconductive drum 304 and the rotation speed of the developing roller 303 is 1:3. In such cases, when the input signal is 111 and the peripheral speed ratio is 1:1, the output density is 0.32. When the peripheral speed ratio is 1:2, the output density is 0.36. When the peripheral speed ratio is at an output density of 0.40 and the output is in monochrome such as yellow, the chroma also varies.

To illustrate the density characteristics of yellow and black simultaneously in FIG. 6B, yellow and black have an identical density characteristic. However, yellow and black each may have a unique density characteristic, and thus yellow and black do not necessarily have an identical density characteristic.

Figure 7:
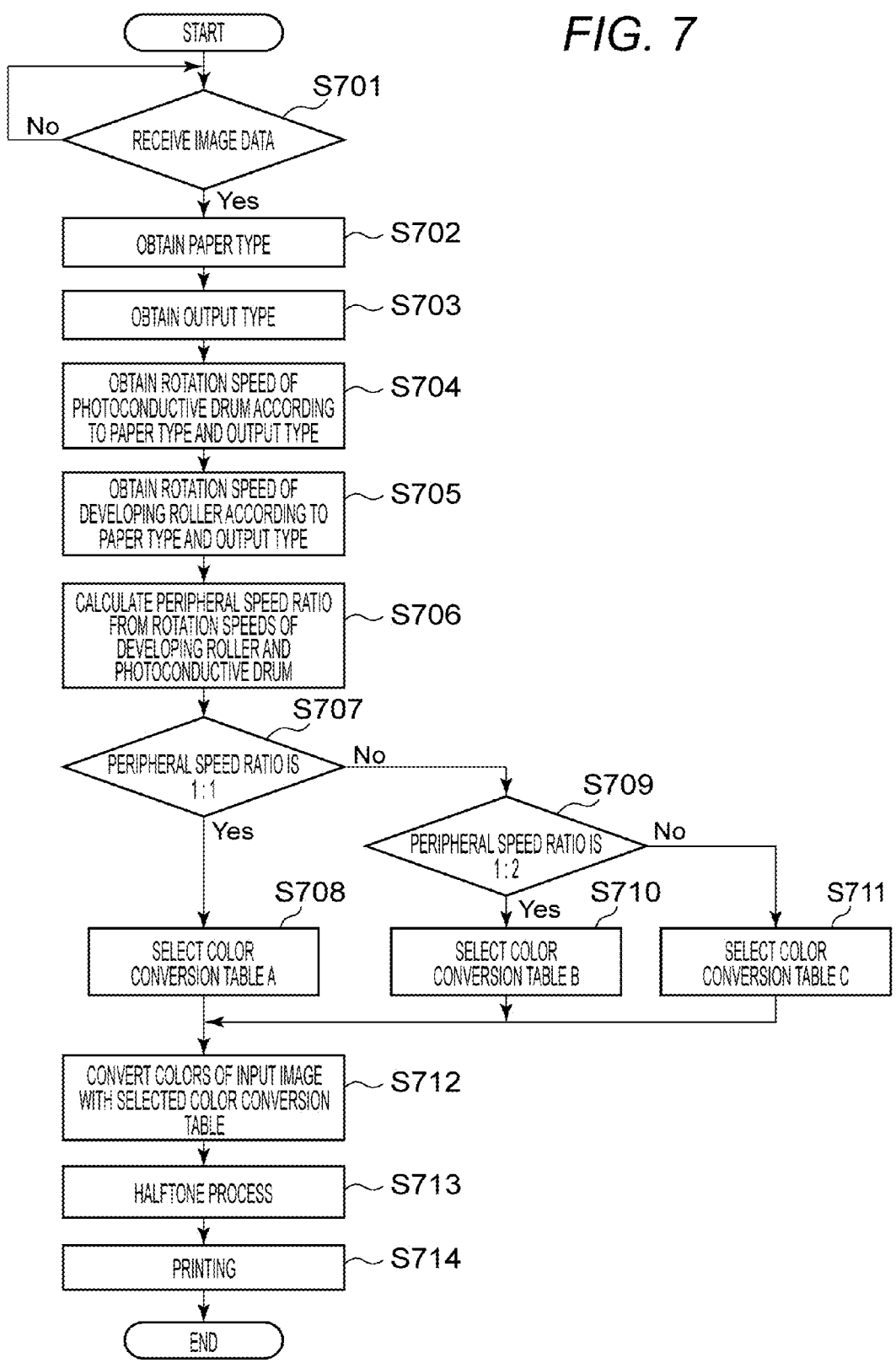
FIG. 7 is a flowchart of the procedures from selection of a color conversion table to printing according to one or more aspects of the present disclosure.

FIG. 7 is a flowchart of exemplary procedures when the image input unit 201 receives image data, the color conversion table selection unit 204 selects a color conversion table and performs color conversion, and the image data is output to the image output unit 203. To perform each step in the flowchart of FIG. 7 on the image formation apparatus 100, the CPU 101 reads a program stored on the ROM 102 onto the RAM 103 and executes the program.

In step S701, the image input unit 201 is on standby for the input of image data. When the image input unit 201 receives image data, the process goes to step S702. In this example, the received image data is RGB data in which each data item is an eight-bit data item. Some of the data items have pixel values R=255, G=136, and B=136. Note that, although the input colors are included in an RGB color space and the output colors are included in a CMYK color space in this example, the present disclosure is not limited to the example, each of the input and output colors may be included in a color space including one or more colors.

In step S702, the color conversion table selection unit 204 obtains the paper type selected with the paper type selection screen 400. Then, the process goes to step S703.

In step S703, the color conversion table selection unit 204 obtains the output type selected with the output type selection screen 410. Then, the process goes to step S704.

In step S704, the color conversion table selection unit 204 obtains the rotation speed of the photoconductive drum 304 according to the obtained paper type and output type, and the photoconductive drum rotation speed table 501. Then, the process goes to step S705.

In step S705, the color conversion table selection unit 204 obtains the rotation speed of the developing roller 303 according to the obtained paper type and output type, and the developing roller rotation speed table 502. Then, the process goes to step S706.

In step S706, the color conversion table selection unit 204 calculates the peripheral speed ratio between the photoconductive drum 304 and the developing roller 303 from the obtained rotation speeds of the photoconductive drum 304 and the developing roller 303. Then, the process goes to step S707. In this example, when the plain paper 401 is selected on the paper type selection screen 400 and the normal 411 is selected on the output type selection screen 410, the rotation speed of the photoconductive drum 304 is 1/1 and the rotation speed of the developing roller 303 is 1/1. Accordingly, the peripheral speed ratio between the photoconductive drum 304 and the developing roller 303 is 1:1. Alternatively, when the glossy paper 403 is selected on the paper type selection screen 400 and the high chroma 412 is selected on the output type selection screen 410, the rotation speed of the photoconductive drum 304 is 1/3 and the rotation speed of the developing roller 303 is 1/1. Accordingly, the peripheral speed ratio between the photoconductive drum 304 and the developing roller 303 is 1:3.

In step S707, the color conversion table selection unit 204 determines whether the peripheral speed ratio is 1:1. When the peripheral speed ratio is 1:1, the process goes to step S708.

In step S708, the color conversion table selection unit 204 refers to a color conversion table selection table 801 illustrated in FIG. 8. FIG. 8 illustrates exemplary correspondence between the color conversion tables and the peripheral speed ratios between the photoconductive drum 304 and the developing roller 303. The color conversion table is previously stored on the ROM 102.

When the peripheral speed ratio is determined from the rotation speeds of the photoconductive drum 304 and the developing roller 303, the color conversion table to be used for printing the image data is automatically selected.

FIGS. 9A to 9C illustrate exemplary tables corresponding to the peripheral speed ratios between the photoconductive drum 304 and the developing roller 303 in the color conversion table selection table 801.

FIG. 9A illustrates an exemplary three-dimensional LUT (color conversion table A) that is adjusted for an appropriate output when the peripheral speed ratio between the photoconductive drum 304 and the developing roller 303 is 1:1. In this three-dimensional LUT, the input colors are included in the RGB color space and the output colors are included in the CMYK color space, and the three-dimensional LUT is previously stored on the ROM 102.

FIG. 9B illustrates an exemplary three-dimensional LUT (color conversion table B) that is adjusted for an appropriate output when the peripheral speed ratio between the photoconductive drum 304 and the developing roller 303 is 1:2. In this three-dimensional LUT, the input colors are included in the RGB color space and the output colors are included in the CMYK color space, and the three-dimensional LUT is previously stored on the ROM 102.

FIG. 9C illustrates an exemplary three-dimensional LUT (color conversion table C) that is adjusted for an appropriate output when the peripheral speed ratio between the photoconductive drum 304 and the developing roller 303 is 1:3. In this three-dimensional LUT, the input colors are included in the RGB color space and the output colors are included in the CMYK color space, and the three-dimensional LUT is previously stored on the ROM 102.

In step S708, the color conversion table selection unit 204 selects the color conversion table A901. Then, the process goes to step S712.

On the other hand, when the color conversion table selection unit 204 determines in step S707 that the peripheral speed ratio is not 1:1, the process goes to step S709.

In step S709, the color conversion table selection unit 204 determines whether the peripheral speed ratio is 1:2. When the peripheral speed ratio is 1:2, the process goes to step S710.

In step S710, the color conversion table selection unit 204 refers to the color conversion table selection table 801 and selects a color conversion table B902. Then, the process goes to step S712.

On the other hand, when the color conversion table selection unit 204 determines in step S709 that the peripheral speed ratio is not 1:2, the process goes to step S711.

In step S711, the color conversion table selection unit 204 refers to the color conversion table selection table 801 and selects a color conversion table C903. Then, the process goes to step S712.

In step S712, the color conversion processing unit 211 converts the colors of the input data according to the color conversion table selected with the color conversion table selection unit 204. Then, the process goes to step S713.

In this example, when the color conversion table selection unit 204 selects the color conversion table A901, for example, the input signals R=255, G=136, and B=136 are converted into C=0, M=111, Y=111, and K=0. At that time, the peripheral speed ratio is 1:1, and thus the density values of the output data are found with the curve 601 of the CM density characteristic in FIG. 6A and the curve 611 of the YK density characteristic in FIG. 6B. In this example, the density values of the output data are C=0, M=0.36, Y=0.32, and K=0.

Alternatively, when the color conversion table selection unit 204 selects the color conversion table C903, for example, the input signals R=255, G=136, and B=136 are converted into C=0, M=100, Y=100, and K=0. At that time, the peripheral speed ratio is 1:3, and thus the density values of the output data are found with the curve 603 of the CM density characteristic in FIG. 6A and the curve 613 of the YK density characteristic in FIG. 6B. In this example, the density values of the output data are C=0, M=0.36, Y=0.32, and K=0.

In other words, even when the rotation speed of the photoconductive drum 304 and the rotation speed of the developing roller 303 (the peripheral speed ratio) at which the image is formed are changed, the same output results can be obtained unless the same pixel values of the image data are changed.

Figure 13:
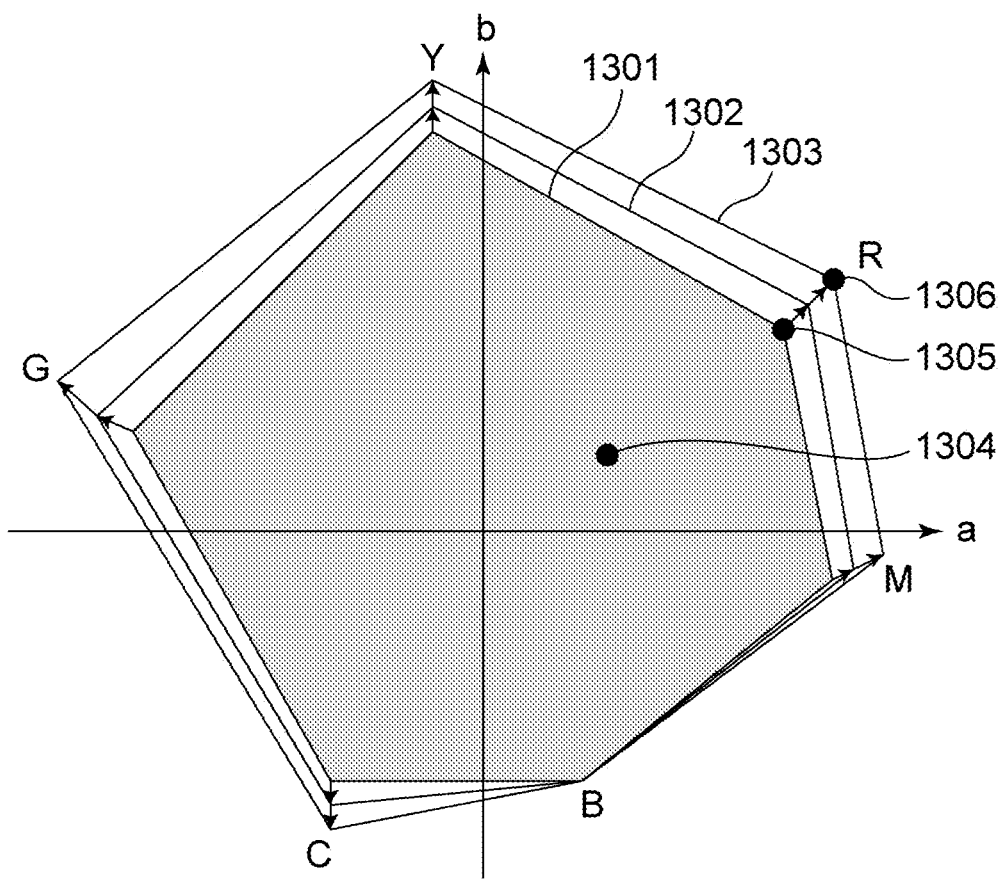
FIG. 13 is a diagram of a color gamut describing a range of the colors of an image that is output at each peripheral speed ratio when the data of the colors is measured and mapped on the ab plane of the Lab color space according to one or more aspects of the present disclosure.

FIG. 13 is a diagram of a color gamut describing a range of the colors of an image that is output at each peripheral speed ratio when the data of the colors is measured and mapped on the ab plane of the Lab color space. The color gamut when the peripheral speed ratio is 1:1 is a color gamut 1301. The color gamut when the peripheral speed ratio is 1:2 is a color gamut 1302. The color gamut when the peripheral speed ratio is 1:3 is a color gamut 1303. It is shown that the colors of each image can be expressed within the surrounded range. The more outwardly the color gamut extends, the higher-chroma image can be expressed. In this example, when the density values of the output data is C=0, M=0.36, Y=0.32, and K=0, the output ab value is at a color value 1304.

The color conversion table corresponding to the rotation speed of the photoconductive drum 304 and the rotation speed of the developing roller 303 (the peripheral speed ratio) at which the image is formed is used as described above. This use enables the same output results to be obtained unless the pixel values of the image data are changed even if the peripheral speed ratio is changed and the amount of toner supply is changed and thus the reproducible color gamut is changed.

On the other hand, when the color conversion table selection unit 204 selects the color conversion table A901, for example, the input signals R=255, G=0, and B=0 are converted into C=0, M=255, Y=255, and K=0. In this example, the peripheral speed ratio is 1:1, and thus the density values of the output data are found with the curve 601 of the CM density characteristic illustrated in FIG. 6A and the curve 611 of the YK density characteristic illustrated in FIG. 6B. In this example, the density values of the output data are C=0, M=1.40, Y=1.30, and K=0. In the color gamut illustrated in FIG. 13, the output ab value corresponding to the density values is plotted as 1305 in FIG. 13. Alternatively, when the color conversion table selection unit 204 selects the color conversion table C903, for example, the input signals R=255, G=0, and B=0 are converted into C=0, M=255, Y=255, and K=0. In this example, the peripheral speed ratio is 1:3, and thus the density values of the output data are found with the curve 603 of the CM density characteristic illustrated in FIG. 6A and the curve 613 of the YK density characteristic illustrated in FIG. 6B. In this example, the density values of the output data are C=0, M=1.50, Y=1.40, and K=0. In the color gamut illustrated in FIG. 13, the output ab value corresponding to the density values is plotted as 1306 in FIG. 13.

As illustrated in FIG. 13, the chroma that the printer can reproduce is increased when the peripheral speed ratio is 1:3 in comparison with when the peripheral speed ratio is 1:1. Thus, the image is output with higher density when the peripheral speed ratio is 1:3. In other words, a high-chroma image can be output. Thus, input signals that are not reproducible and are alternatively expressed as the color (1305) in the color gamut when the peripheral speed ratio is 1:1 can be reproducible as the color (1306) when the peripheral speed ratio is 1:3 even while the input signals are not changed.

As described above, a color in the color gamut that is reproducible when the peripheral speed ratio between the photoconductive drum 304 and the developing roller 303 is 1:1 can be output as the same results unless the pixel values of the image data are changed even if the peripheral speed ratio is changed and the reproduction range is extended.

On the other hand, varying the peripheral speed ratio between the photoconductive drum 304 and the developing roller 303 and extending the color reproduction range enable a color that is not reproducible when the peripheral speed ratio is 1:1 to be reproducible.

In step S713, the halftone processing unit 212 processes the image data of which colors have been converted in a halftone process. Then, the process goes to step S714.

In step S714, the image output unit 203 transmits the image data that have been processed in the halftone process via the engine I/F 107 to the printer engine 111 to print the image data. Then, the process illustrated in FIG. 7 ends.

Performing the process illustrated in FIG. 7 determines the color conversion table to be used for a printing process according to the peripheral speed ratio. At that time, a part of the input image data to be processed where the pixel is bright or the chroma is low is output as the same image without any change regardless of the peripheral speed ratio between the photoconductive drum 304 and the developing roller 303. On the other hand, a part where the pixel is dark or the chroma is high is output as a higher-chroma or higher-density image as the peripheral speed ratio between the photoconductive drum and the developer is larger.

Note that, although the rotation speed of the photoconductive drum is obtained in S704 and the rotation speed of the developing roller is obtained in S705, the peripheral speeds may be obtained instead of the rotation speeds. Alternatively, a table in which a combination of the paper type and the output type, and a color conversion table corresponding to the combination are previously determined may be stored. By using such a table, a color conversion table may be determined directly according to the combination of the information about the paper type and the information about the output type without using the information about the rotation speed or peripheral speed obtained in S704 and S705. In other words, in S708 to S711, a color conversion table may be selected according to the information obtained in S702 and S703.

According to the present exemplary embodiment, a color conversion table is determined according to the peripheral speed ratio between the photoconductive drum 304 and the developing roller 303. Using the table enables a color that is reproducible at a normal peripheral speed ratio (the peripheral speed ratio of 1/1) to be output as the same color result unless the pixel values of the image data are changed even if the peripheral speed ratio is changed for outputting a high-chroma image.

On the other hand, using the table enables a color that is not reproducible with the printer at the normal peripheral speed ratio and is reproducible only when the peripheral speed ratio is changed for outputting a high-chroma image to be output with maximized chroma.

Second Embodiment

In the first embodiment, a color conversion table is selected according to the ratio between the rotation speed of the developing roller 303 and the rotation speed of the photoconductive drum 304 (the peripheral speed ratio). In the present exemplary embodiment, a method in which a color conversion table is selected according to the rotation speed of the developing roller 303 and the rotation speed of the photoconductive drum 304 and then the color conversion processing unit performs color conversion will be described.

The system configuration and functional arrangement of the image formation apparatus, the configuration of the printer engine, and the paper type setting value selection screen and output type setting value selection screen displayed on the display unit are similar to those of the first embodiment. Thus, the descriptions of FIG. 1, FIG. 2, FIG. 3, and FIGS. 4A and 4B will be omitted. Similarly, the output density characteristic of the printer engine, and the color conversion tables are similar to those of the first embodiment. Thus, the descriptions of FIGS. 6A and 6B and FIGS. 9A to 9C will also be omitted.

FIG. 11 illustrates the rotation speeds of the photoconductive drum 304 and the rotation speeds of the developing roller 303 that are determined according to the results selected on the paper type selection screen 400 and the output type selection screen 410. A rotation speed determination table 1100 illustrated in FIG. 11 shows the rotation speeds of the developing roller and the photoconductive drum determined according to the paper type and the output type and is previously stored on the ROM 102. The rotation speeds SA, SB, SC, SD, SE, and SF are actual rotation speeds of each of the photoconductive drum 304 and the developing roller 303, for example, 100 rpm (the rpm is an acronym for round per minute, and is the rotation frequency every minute). Each rotation speed is calculated from the productivity of the engine (how many sheets of paper in a predetermined size are output per unit time), the diameter of the photoconductive drum 304, and the diameter of the developing roller 303. The photoconductive drum 304 rotates more slowly at a rotation speed SB than at a rotation speed SA. The photoconductive drum 304 rotates more slowly at a rotation speed SC than at a rotation speed SB. Similarly, the developing roller 303 rotates more slowly at a rotation speed SE than at a rotation speed SD. The developing roller 303 rotates more slowly at a rotation speed SF than at a rotation speed SE.

FIG. 12 illustrates a color conversion table selection table 1200 that is used to determine a color conversion table according to the combination of a rotation speed of the developing roller 303 and a rotation speed of the photoconductive drum 304, and is previously stored on the ROM 102. The color conversion table selection table 1200 shows the color conversion tables A, B, and C to be selected according to the combination of one of the rotation speeds SA, SB, and SC of the photoconductive drum 304 and one of the rotation speeds SD, SE, and SF of the developing roller 303. As illustrated in FIG. 11, there are not the combination of SA and SE, the combination of SA and SF, the combination of SB and SF, and the combination of SC and SE. Thus, the color conversion table selection table does not include the color conversion tables for these combinations.

Figure 10:
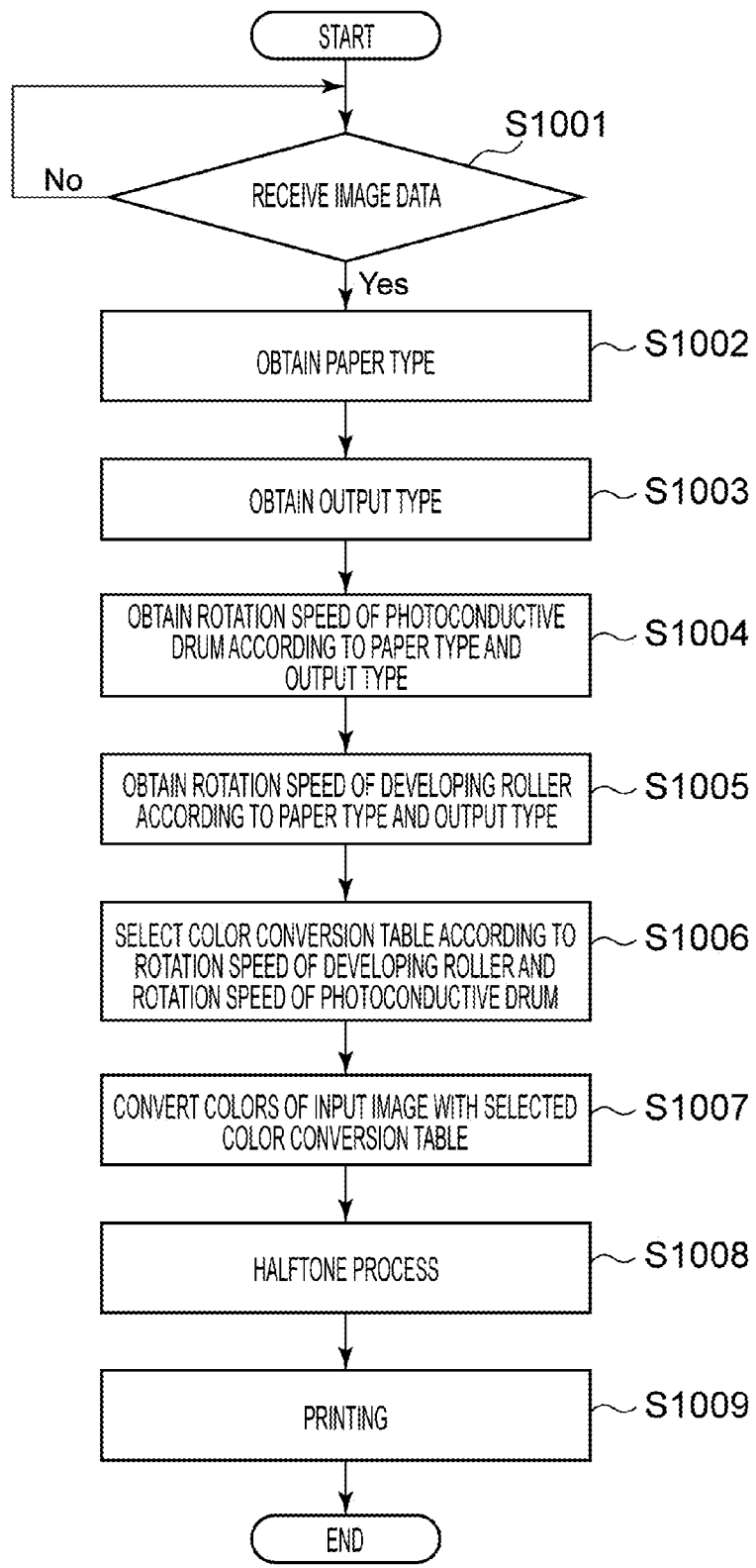
FIG. 10 is a flowchart of the procedures from selection of a color conversion table to printing according to one or more aspects of the present disclosure.

FIG. 10 illustrates a flowchart of exemplary procedures when the image input unit 201 receives the image data, the color conversion table selection unit 204 selects a color conversion table, and the colors of the image data are converted and the image data is output to the image output unit 203. To perform each step illustrated in the flowchart of FIG. 10 on the image formation apparatus 100, the CPU 101 reads a program stored on the ROM 102 onto the RAM 103 and executes the program.

In step S1001, the image input unit 201 is standby for the input of the image data. When the image input unit 201 receives the input, the process goes to step S1002. In this example, the received image data is RGB data in which each data item is an eight-bit data item, and some of data items have pixel values R=255, G=136, and B=136.

In step S1002, the color conversion table selection unit 204 obtains the information about the paper type selected on the paper type selection screen 400. Then, the process goes to step S1003.

In step S1003, the color conversion table selection unit 204 obtains the information about the output type selected on the output type selection screen 410. Then, the process goes to step S1004.

In step S1004, the color conversion table selection unit 204 obtains the rotation speed of the photoconductive drum 304 according to the obtained paper type and output type, and the photoconductive drum rotation speed table 501. Then, the process goes to step S1005.

In step S1005, the color conversion table selection unit 204 obtains the rotation speed of the developing roller 303 according to the obtained paper type and output type, and the developing roller rotation speed table 502. Then, the process goes to step S1006.

In step S1006, according to the rotation speed of the developing roller 303 and the rotation speed of the photoconductive drum 304, a color conversion table to be used for color conversion is selected. Then, the process goes to step S1007.

An example in which the plain paper 401 is selected on the paper type selection screen 400 and the normal 411 is selected on the output type selection screen 410 will be described hereinafter. In this example, the rotation speed of the photoconductive drum 304 is SA and the rotation speed of the developing roller 303 is SD according to the rotation speed determination table 1100 illustrated in FIG. 11. Accordingly, the color conversion table A901 is selected from the color conversion table selection table 1200 as the color conversion table corresponding to the combination of SA and SD. Alternatively, when the glossy paper 403 is selected on the paper type selection screen 400 and the high chroma 412 is selected on the output type selection screen 410, the rotation speed of the photoconductive drum 304 is SC and the rotation speed of the developing roller 303 is SD according to the rotation speed determination table 1100 illustrated in FIG. 11. Accordingly, the color conversion table C903 is selected from the color conversion table selection table 1200.

In step S1007, the color conversion processing unit 211 converts the colors of the input data according to the color conversion table selected with the color conversion table selection unit 204. Then, the process goes to step S1008. In this example, when the color conversion table selection unit 204 selects the color conversion table A901, for example, the input signals R=255, G=136, and B=136 are converted into C=0, M=111, Y=111, and K=0. In this example, the density values of the output data are found with the curve 601 of the CM density characteristic in FIG. 6A and the curve 611 of the YK density characteristic in FIG. 6B. In this example, the density values of the output data are C=0, M=0.36, Y=0.32, and K=0.

Alternatively, when the color conversion table selection unit 204 selects the color conversion table C903, for example, the input signals R=255, G=136, and B=136 are converted into C=0, M=100, Y=100, and K=0. In this example, the density values of the output data are found with the curve 603 of the CM density characteristic in FIG. 6A and the curve 613 of the YK density characteristic in FIG. 6B. In this example, the density values of the output data are C=0, M=0.36, Y=0.32, and K=0.

In other words, the same results can be output unless the signal values of the image data are changed even if the combination of the rotation speed of the developing roller 303 and the rotation speed of the photoconductive drum 304 is changed.

Next, In step S1008, the halftone processing unit 212 processes the image data of which colors have been converted in a halftone process. Then, the process goes to step S1009.

Next, in step S1009, the image output unit 203 transmits the image data that has been processed in the halftone process via the engine I/F 107 to the printer engine 111 to print the image data. Then the process illustrated in FIG. 10 ends.

By performing the process illustrated in FIG. 10, the chroma of the output image can be controlled according to the combination of the rotation speed of the developing roller 303 and the rotation speed of the photoconductive drum 304 without calculation of the peripheral speed ratio.

According to the present exemplary embodiment, the peripheral speed ratio between the photoconductive drum 304 and the developing roller 303 is not found and the rotation speeds of the photoconductive drum 304 and the developing roller 303 (the combination of the rotation speeds) are determined. This determination determines a table used for a color conversion process. Using the determined color conversion table enables a color that is reproducible when the photoconductive drum 304 and the developing roller 303 rotate at a normal rotation speed to be output as the same color even if the combination of the rotation speed of the developing roller 303 and the rotation speed of the photoconductive drum 304 is changed for outputting a high-chroma image.

On the other hand, if a color is not reproducible when the photoconductive drum 304 and the developing roller 303 rotate at a normal rotation speed and is reproducible only when the combination of the rotation speed of the developing roller 303 and the rotation speed of the photoconductive drum 304 is changed for outputting a high-chroma image, using the determined color conversion table enables the color to be output with increased chroma.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-190476, filed Sep. 29, 2016, which is hereby incorporated by reference herein in its entirety.

What is claimed is:

1. An image formation apparatus for forming an image by using an electrostatic latent image formed on an image bearing member, the image formation apparatus comprising:
the image bearing member on which the electrostatic latent image is formed;
a developing agent bearing member configured to carry a developing agent used to develop the electrostatic latent image formed on the image bearing member;
an obtaining unit configured to obtain information about a rotation speed of the image bearing member and a rotation speed of the developing agent bearing member; and
a determination unit configured to determine a color conversion table according to the information about the rotation speed of the image bearing member and the rotation speed of the developing agent bearing member, the information being obtained with the obtaining unit, the color conversion table being used to transfer and record input image data.

2. The image formation apparatus according to claim 1, wherein the information about the rotation speed of the image bearing member and the rotation speed of the developing agent bearing member is a peripheral speed of the image bearing member and a peripheral speed of developing agent bearing member.

3. The image formation apparatus according to claim 1, wherein the information about the rotation speed of the image bearing member and the rotation speed of the developing agent bearing member is a peripheral speed ratio, and the peripheral speed ratio is a ratio of the peripheral speed of the developing agent bearing member to the peripheral speed of the image bearing member.

4. The image formation apparatus according to claim 1, wherein the determination unit determines to use a first color conversion table capable of forming an image in colors in a first color gamut when the information about the rotation speed of the image bearing member and the rotation speed of the developing agent bearing member indicates that the peripheral speed ratio that is a ratio of the peripheral speed of the developing agent bearing member to the peripheral speed of the image bearing member is one, and
the determination unit determines to use a second color conversion table capable of forming an image in colors in a second color gamut that is wider than the first color gamut when the information indicates that the peripheral speed ratio that is a ratio of the peripheral speed of the developing agent bearing member to the peripheral speed of the image bearing member is larger than one.

5. The image formation apparatus according to claim 1, wherein a signal value is converted according to the color conversion table determined with the determination unit, and the converted signal value is converted into an output density value according to a characteristic that indicates an output density value corresponding to the signal value and is determined according to the information obtained with the obtaining unit.

6. The image formation apparatus according to claim 1, further comprising:
a first setting unit configured to set a type of a recording medium used to form an image,
wherein, according to a setting set with the first setting unit, the information about the rotation speed of the image bearing member and the information about the rotation speed of the developing agent bearing member are determined.

7. The image formation apparatus according to claim 1, further comprising:
a second setting unit configured to set a type of output indicating a color gamut of an image to be formed,
wherein, according to a setting set with the second setting unit, the information about the rotation speed of the image bearing member and the information about the rotation speed of the developing agent bearing member are determined.

8. The image formation apparatus according to claim 1, further comprising:
a third setting unit configured to set a type of a recording medium used to form an image and a type of output indicating a color gamut of an image to be formed on the recording medium,
wherein, according to settings set with the third setting unit, the information about the rotation speed of the image bearing member and the information about the rotation speed of the developing agent bearing member are determined.

9. The image formation apparatus according to claim 1, further comprising:
a storage unit configured to store a plurality of color conversion tables on a storage apparatus,
wherein, according to the information obtained with the obtaining unit, a color conversion table is determined from the color conversion tables stored on the storage apparatus.

10. The image formation apparatus according to claim 1, wherein the image bearing member is a photoconductive drum, and the developing agent bearing member is a developing roller.

11. A control method for controlling an image formation apparatus for forming an image by using an electrostatic latent image formed on an image bearing member, the image formation apparatus including the image bearing member on which the electrostatic latent image is formed and a developing agent bearing member configured to carry a developing agent used to develop the electrostatic latent image formed on the image bearing member, the control method comprising:
obtaining information about a rotation speed of the image bearing member and a rotation speed of the developing agent bearing member; and
determining a color conversion table according to the information about the rotation speed of the image bearing member and the rotation speed of the developing agent bearing member, the information being obtained in the obtaining, the color conversion table being used to transfer and record input image data.

12. A computer-readable storage medium storing a control method for controlling an image formation apparatus for forming an image by using an electrostatic latent image formed on an image bearing member, the image formation apparatus including the image bearing member on which the electrostatic latent image is formed and a developing agent bearing member configured to carry a developing agent used to develop the electrostatic latent image formed on the image bearing member, the control method comprising:
obtaining information about a rotation speed of the image bearing member and a rotation speed of the developing agent bearing member; and
determining a color conversion table according to the information about the rotation speed of the image bearing member and the rotation speed of the developing agent bearing member, the information being obtained in the obtaining, the color conversion table being used to transfer and record input image data.

13. An image formation apparatus for forming an image by using an electrostatic latent image formed on an image bearing member, the image formation apparatus comprising:
the image bearing member on which the electrostatic latent image is formed;
a developing agent bearing member configured to carry a developing agent used to develop the electrostatic latent image formed on the image bearing member;
a determination unit configured to determine a color conversion table according to setting information about a type of the recording medium used to form an image and setting information about a type of output indicating a color gamut of the image to be formed, the color conversion table being used to transfer and record input image data; and
an image formation unit configured to convert a signal value of the input image data according to the color conversion table determined with the determination unit and form an image with the converted signal value.

* * * * *